Jan. 3, 1928.
L. A. LARSSEN
1,655,189
LUBRICATING APPARATUS
Filed March 14, 1922
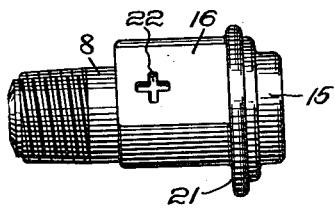
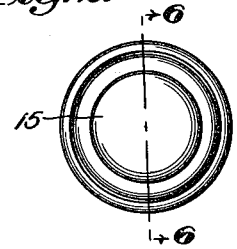
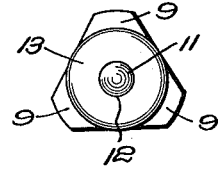
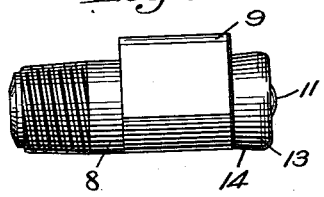
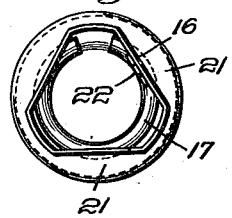
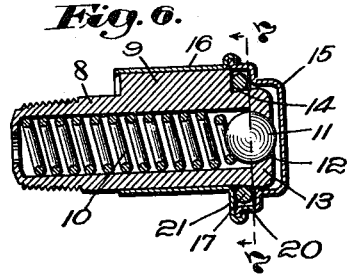
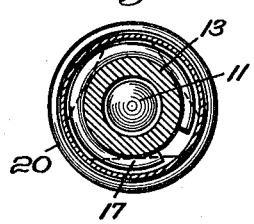
Inventor:
Lars A. Larssen.
by Emery Booth Janney Varney
Attys.

Patented Jan. 3, 1928.

1,655,189

UNITED STATES PATENT OFFICE.

LARS ANDREW LARSSEN, OF BOSTON, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING APPARATUS.

Application filed March 14, 1922. Serial No. 543,552.

This invention pertains to improvements in lubricating apparatus, and more particularly, though not exclusively, to the protection of lubricant-receiving tubular coupling members from dirt and the like by the provision of suitable caps.

It is among the objects of the invention to provide a cap for a lubricant-receiving coupling member which is easy to apply and remove and which is effective to protect the coupling member from dust and dirt.

In the drawings which show a preferred form of one embodiment of my invention:—

Figure 1 is a side elevation of a lubricant-receiving tubular coupling member provided with a preferred form of cap;

Fig. 2 is a top view of the cap illustrated in Fig. 1;

Fig. 3 is a side elevation of the coupling member with the cap removed;

Fig. 4 is an end elevation of the coupling member shown in Fig. 3;

Fig. 5 is a bottom view of the cap illustrated in Figs. 1 and 2;

Fig. 6 is a section through the coupling member and cap on the line 6—6 of Fig. 2; and Fig. 7 is a section on the line 7—7 of Fig. 6.

Referring to the drawings and to the preferred form of my invention selected for illustrative purposes, I have shown a lubricant-receiving tubular coupling member 8 presenting laterally extending projections 9, herein shown as three in number. Through the coupling member, I have shown a conduit for the passage of lubricant to the part to be lubricated, this conduit preferably containing, as illustrated, a spring 10 pressing a ball check 11 normally to close a lubricant-receiving opening 12 in the lubricant-receiving end of the coupling member. At this lubricant-receiving end of the coupling member, I have shown a head 13, and beneath this head 13 I have shown a recessed portion or neck 14. The preferred form of cap illustrated includes a casing formed of two parts, the top part 15 and a skirt part 16, the top part 15 being adapted to enclose the lubricant-receiving end of the nipple and the skirt part 16 being adapted to protect the lateral and outer faces of the projections 9. Between the top portion 15 and the skirt portion 16, I have shown a spring 17, preferably annular as illustrated, and adapted to snap over the head 13 of the coupling part to embrace the neck 14 and hold the cap firmly on the coupling member or nipple.

The spring 17 is thus loosely held within the casing, no substantial movement axially of the casing being permitted by reason of the over and underlying shoulder presented by the parts 15 and 16 of the casing. No substantial transverse movement of the spring 17 can take place because it is surrounded by the outer flange 20 of the casing part 15. In the preferred form of my invention illustrated, the spring 17 lies with its outer edges behind the plane of portions of the skirt part 16 of the casing (as best viewed in Fig. 5), while the inner portion of the annulus forming the spring lies inside of the planes of the sides of the skirt portion of the casing so that, when the nipple is entered in the casing, the head 13 thereof will wedge apart and open the spring 17 until the latter snaps into the neck 14. Where, as in the preferred form of my invention illustrated, the neck 14 is provided by a gentle taper, the removal of the cap from the coupling member or nipple may be very easily effected, especially where, as illustrated, substantial shoulder means (herein typified by the overhanging or shoulder portions 21) are provided on the cap member. As the spring is not rigidly connected to the casing, there may be some rattle of the latter unless the skirt portion 16 or other portion of the casing fits relatively tight against some part of the nipple or coupling member. To prevent this rattle without great accuracy in the manufacture of the parts, I may provide an instruck boss 22 on one of the sides of the skirt portion of the casing, this boss being of any suitable shape, herein shown as a cross, and exerting a slight pressure against the underlying face of a lateral projection on the nipple.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. The combination with a lubricant-receiving tubular coupling member presenting at its lubricant-receiving end a head, central projecting coupling means of greater cross-sectional area than the cross-sectional area of said head, and a neck portion above said coupling means, said neck portion of lesser cross-sectional area than said head, of a dust cap presenting a top portion for closing said lubricant-receiving end, a skirt portion laterally enclosing said coupling means, and a resilient portion between said top portion and skirt portion for engagement in said neck portion to hold said dust cap on said coupling member.

2. The combination with a lubricant-receiving tubular coupling member having laterally extending coupling projections and presenting at the lubricant-receiving end a head, and presenting a neck between said head and said projections, of a cap for closing said lubricant-receiving end containing a spring for engagement with said neck, said cap including covering portions extending over and laterally enclosing said projections thereby to form a protective covering for said coupling projections.

3. A cap for a lubricant-receiving coupling member comprising a casing having an end for enclosing the lubricant-receiving opening of the member, a spring contained in the cap for engagement beneath a head adjacent the lubricant-receiving opening of the member and a cover portion at the opposite side of said spring from said end, said cover shaped laterally to overlie and protect lateral coupling projections on said member.

4. A cap for a lubricant-receiving coupling member presenting a casing including a top portion and a skirt portion, said portions crimped together, and a spring held between said portions.

5. A cap for a lubricant-receiving coupling member presenting a casing including a top portion and a skirt portion, said portions crimped together, and an annular spring held between said portions.

6. A cap for a lubricant-receiving coupling member presenting a casing including a top portion and a skirt portion, said portions crimped together, and a spring held between said portions, said skirt portion presenting spring-locating shoulder means at one side of said spring and said top portion presenting spring-locating shoulder means at the other side of said spring.

7. A cap for a lubricant-receiving coupling member presenting a casing including two parts crimped together and containing a separate spring held against substantial movement axially of the cap by said two pieces of the casing and held against substantial movement in a direction transverse to said axis by one of said pieces.

8. The combination with a lubricant-receiving nipple having a central coupling portion, a head beyond said coupling portion and a neck between said head and coupling portion, of a dust cap having a skirt portion for covering said coupling portion, a top portion for covering said head and a spring held against longitudinal movement between said top and skirt portions for engagement with said neck, said spring adapted to abut against said coupling portion thereby to prevent further movement of said cap over the nipple.

In testimony whereof, I have signed my name to this specification.

LARS ANDREW LARSSEN.